United States Patent
Weiss et al.

[11] Patent Number: 5,875,720
[45] Date of Patent: Mar. 2, 1999

[54] PRODUCTION OF PRINTS BY THE OFFSET HEATSET PROCESS

[75] Inventors: Stefan Weiss, Neckargemünd; Michael Wolfgang Müller, Biblis; Klaus Boehlke, Hessheim; Wilhelm Weber, Neustadt, all of Germany

[73] Assignee: BASF Aktiengesellschaft, Ludwigshafen, Germany

[21] Appl. No.: 682,756

[22] PCT Filed: Jan. 23, 1995

[86] PCT No.: PCT/EP95/00225

§ 371 Date: Jul. 31, 1996

§ 102(e) Date: Jul. 31, 1996

[87] PCT Pub. No.: WO95/21221

PCT Pub. Date: Aug. 10, 1995

[30] Foreign Application Priority Data

Feb. 4, 1994 [DE] Germany .............................. 4403478.4

[51] Int. Cl.⁶ ............................ C09D 11/12; B41L 35/14; B41F 7/02
[52] U.S. Cl. ......................... 101/488; 101/491; 101/492; 106/31.62; 523/161; 524/277; 524/489
[58] Field of Search ...................... 523/161, 160; 106/31.62; 524/275, 277, 489; 101/488, 492

[56] References Cited

U.S. PATENT DOCUMENTS

| Re. 35,229 | 5/1996 | Blanch et al. | 524/588 |
| 3,330,684 | 7/1967 | Wheeler | 524/313 |
| 4,338,230 | 7/1982 | Ames | 525/301 |

FOREIGN PATENT DOCUMENTS

| 304 245 | 2/1989 | European Pat. Off. . |
| 324 077 | 7/1989 | European Pat. Off. . |
| 1087915 | 10/1967 | United Kingdom . |
| 1557285 | 12/1979 | United Kingdom . |

OTHER PUBLICATIONS

JP 05062911—Chem. Abstrst, Sep. 1993.

*Primary Examiner*—Tae Yoon
*Attorney, Agent, or Firm*—Keil & Weinkauf

[57] ABSTRACT

Prints are produced by the offset heatset process using a printing ink based on mineral oil and additionally using an agent for increasing the abrasion resistance of the prints, where the agent for increasing the abrasion resistance is an oxidized olefin polymer which has a melt viscosity of from 100 to 15,000 mm²/s, measured in accordance with DGF M-III 8 (75), and an acid number of from 5 to 50 mg of KOH/g of polymer, measured in accordance with DGF M-IV 2 (57).

5 Claims, No Drawings

PRODUCTION OF PRINTS BY THE OFFSET HEATSET PROCESS

The present invention relates to an improved process for the production of prints by the offset heatset process using a printing ink, preferably based on mineral oil, and using an agent for increasing the abrasion resistance of the print. The present invention furthermore relates to certain novel printing inks which are suitable for offset heatset printing, and to oxidized polyethylene having a certain specification.

Offset printing and the printing inks based on mineral oil that are used for this purpose are known in general terms. In addition to pigments, the binder and the mineral oil diluent, these printing inks usually also contain auxiliaries for simplifying the printing operation, increasing the stability of the printing ink and improving the quality of the resultant prints, including, in particular, additives for increasing the abrasion resistance of the prints.

In offset printing technology, there are various methods of drying the printed papers. In the coldset process, in which the print is allowed to dry at room temperature, the abrasion resistance of the prints is increased principally using waxes and wax-like olefin polymers, such as waxlike unoxidized polyethylene.

In the heatset process, in which the printed paper webs are briefly heated to from about 80° to 200° C. in order to set the print, these waxes are, however, unsuitable since they melt and/ or dissolve during this thermal treatment and thus lose the desired action. Use is therefore made of high-melting, wax-like polymers made from fluorinated olefins, in particular polytetrafluoroethylene waxes or mixtures thereof with other natural or synthetic waxes. However, these substances are expensive and have the disadvantage that hydrogen fluoride and volatile organofluorine compounds are liberated when the printed paper is burnt.

DE-A 25 47 967 discloses the addition of finely divided oxidized polyethylene in order to improve printing inks for intaglio, but not for improving offset heatset printing inks based on mineral oil. EP-A 324 077 mentions oxidized polyolefin waxes as additives for intaglio inks.

JP-B 62911/93 recommends the addition of various finely divided resins having a spherical shape, for example nylon, silicone, vinyl, epoxy, olefin and styrene resins, natural waxes, paraffin waxes, polyolefins and general oxidation products of these resins, to offset heatset printing inks.

It is an object of the present invention to improve, in an economical manner, the abrasion resistance of prints produced by offset heatset printing.

We have found that this object is achieved by a process for the production of prints by the offset heatset process using a printing ink based on mineral oil and additionally using an agent for increasing the abrasion resistance of the prints, which comprises using a finely divided oxidized olefin polymer which has an acid number of from 5 to 50 mg of KOH/g of polymer, measured in accordance with DGF M-IV 2 (57), and a melt viscosity of from 100 to 15,000 mm$^2$/s, measured in accordance with DGF M-III 8 (75).

Novel printing inks which are suitable for said purpose, and oxidized polyethylene having a certain new specification have furthermore been found.

The oxidized polyolefin waxes as defined, referred to as oxidized waxes below, are known in general terms, some being commercially available and the remainder being obtainable in a known manner, for example by oxidizing the parent olefin polymers in aqueous dispersion using air, as described in greater detail in, for example, DE-A 15 70 652.

Suitable olefin polymers on which the oxidized waxes are based are, in particular:

polyethylene having a molecular weight (weight average determined by gel permeation chromatography) in the range from 100,000 to 10,000,000 g/mol, including low- and medium-density polyethylene (LLDPE, LDPE and MDPE), in particular high-density polyethylene (HDPE), ie. having a density of greater than 0.94 g/cm$^3$, atactic, syndiotactic and preferably isotactic polypropylene having a molecular weight in the range from 70,000 to 500,000 g/mol, copolymers having a molecular weight in the range from 100,000 to 10,000,000 comprising from 0.1 to 99.9 mol % of ethylene and from 99.0 to 0.1 mol % of a $C_3$- to $C_8$-alk-1-ene, in particular propylene; further suitable alk-1-enes are, for example, but-1-ene, pent-1-ene, hex-1-ene, oct-1-ene and 4-methylpent-1-ene, and mixtures of alk-1-enes.

In general, the olefin polymers can also contain small amounts for up to 10 mol %—of other comonomers so long as these do not significantly change the properties of the polymer.

The olefin polymers are likewise known or obtainable in a known manner, so that further details in this respect are unnecessary. The acid number of the oxidized waxes is from 5 to 50 KOH/g of polymer, preferably from 15 to 30 mg of KOH/g of polymer. The acid number indicates how many mg of KOH are necessary to neutralize the oxidized wax and is expediently determined by the measurement method of the Deutschen Gesellschaft für Fettwissenschaft e.V. DGF M-IV 2 (57). The acid number is a measure of the degree of oxidation of the olefin polymer and can be adjusted in a manner known per se.

The melt viscosity of the oxidized waxes is in the range from 100 to 15,000 mm$^2$/s, preferably from 200 to 8000 mm$^2$/s, measured in accordance with DGF M-III 8 (75). This method involves measurement of the flow behavior of a polymer melt, ie. the dependence of the shear gradient on the applied shear stress. The melt viscosity of the wax is lower than that of the parent olefin polymers since the olefin polymers undergo some degradation on oxidation. The choice of the fine parameters in the oxidation allows this degradation to be controlled in a manner known per se, in turn allowing the desired melt viscosity to be established.

The finely divided waxes as defined are employed in finely divided form, in which they are also present in the finished print without forming a film. Their mean particle size is preferably from 0.5 to 40 μm, in particular from 12 to 30 μm. The particle size is expediently measured by the laser diffraction method in a Sympatec instrument. The finely divided character is preferably produced by grinding the oxidized wax, for example in a fluidized bed opposed-jet mill, as described, inter alia, in Höffl, Karl, Zerkleinerungs- und Klassiermaschinen, Springer-Verlag, 1986, pages 200 to 203. The finely divided oxidized wax can be added to the printing ink in the form of a dry powder or preferably in the form of a mineral-oil suspension. Depending on the base material, the oxidized polyolefins have a density of from about 0.87 to about 1.00 g/cm$^3$, measured in accordance with DGF M-III 2a (57). Oxidized waxes having a very high density, in particular oxidized polyethylene having a density of from 0.87 to 1.00 g/cm$^3$, are particularly recommended. Oxidized polyethylene having this density, an acid number of from 5 to 50 mg/g of polymer, a mean particle size of from 0.5 to 40 μm and a melt viscosity of from 100 to 15,000 mm$^2$/s was hitherto unknown and is particularly suitable for the purposes of the invention.

The same applies to printing inks based on mineral oil which contain from 0.1 to 10% by weight, based on the solids content of the printing ink, of a finely divided oxidized olefin polymer having a mean particle size of from 0.5 to 40 μm, an acid number of from 5 to 50 mg of KOH/g of polymer, measured in accordance with DGF M-IV 2 (57) and a melt viscosity of from 100 to 15,000 mm2/s, measured in accordance with DGF M-III 8 (75).

The concentration of the finely divided oxidized wax in the printing ink is generally from 0.1 to 10% by weight, preferably from 0.3 to 2.0% by weight, based on the solids content of the printing ink.

Otherwise, the composition of the printing ink to be employed in accordance with the invention for offset heatset printing corresponds to that which is known in general terms for this purpose, ie. from 20 to 70% by weight of a binder and from 10 to 30% by weight of a pigment and/or soluble dye, in each case based on the solids content. Suitable binders are thermally crosslinkable resins, such as colophony, and, in particular, air-drying oils, in particular linseed oil.

The mineral-oil content in these printing inks, however, as is usual in offset printing, is generally from 10 to 50% by weight, based on the total amount of printing ink. Suitable mineral oils are preferably aromatic-free hydrocarbons having a boiling range from 200° to 370° C.

In addition to said constituents, the printing inks can also contain further auxiliaries, for example antioxidants and waxes, in the amounts conventional for these substances.

The offset heatset printing process is principally used for printing paper, but other substrates, for example board, are also suitable.

The prints obtainable by the novel process, in particular those obtained using the novel printing inks as defined and the new specification of the oxidized polyethylene wax, are distinguished by high abrasion resistance. The abrasion resistance can be determined using test equipment in which the printed paper is subjected to abrasion by means of an abrasive element until the print exhibits clearly visible traces of abrasion.

EXAMPLES

Using a Printing Ink Comprising 25 g of phenol-modified colophony resin,
5 g of alkyd resin,
40 g of mineral oil (boiling range from 250° to 300° C.),
5 g of linseed oil/soybean oil,
18 g of Lithol Rubin D 45 60 (calcium salt of an azo pigment) and
0.3 g of an oxidized polyethylene wax having the following properties:

Melt viscosity (DGF M-III 8 (75)): 4500 $mm^2/s$ Acid number (DGF M-IV 2 (57)); 22 mg of KOH/g of polymer Density (DGF M-III 2a (57)): 0.99 $g/cm^3$ Mean particle size: 18 μm, offset prints were produced in a conventional manner on offset paper coated on both sides, and the prints were then brought into contact with a roll at 150° C. for three seconds in order to dry and set the print. The abrasion resistance of the print was then determined in a Prüfbau abrasion tester by repeated rubbing. The abrasion resistance is the number of rubbing cycles after which the print exhibits clear traces of abrasion. The number of cycles in this example is 50.

Without the use of an auxiliary for increasing the abrasion resistance, the number of cycles is 8.

When the waxlike, micronized fluorinated polymer Fluon FL 1680® from 3M is used in addition, the number of cycles is 25.

We claim:

1. A process for the production prints by the offset heatset process using a printing ink based on mineral oil and additionally using an oxidized olefin polymer for increasing the abrasion resistance of the prints, which comprises using an oxidized olefin polymer having a mean particle size in the range from 0.5 to 40 μm which has an acid number of from 5 to 50 mg of KOH/g of polymer, measured in accordance with DGF M-IV 2 (57), and a melt viscosity of from 100 to 15,000 $mm^2/s$, measured in accordance with DGF M-III 8 (75), and wherein the density of the oxidized olefin polymer is in the range from 0.87 to 1.00 $g/cm^3$, measured in accordance with DGF M-III 2a (57).

2. A process as claimed in claim 1, wherein the oxidized olefin polymer is an oxidized polyethylene.

3. A process as claimed in claim 1, wherein the oxidized olefin polymer is an oxidized polypropylene.

4. A process as claimed in claim 3, wherein the oxidized polypropylene has a melting point of from 110° to 170° C.

5. A process as claimed in claim 1, wherein the oxidized olefin polymer is employed in the form of fine particles obtained by grinding.

* * * * *